United States Patent
Zhu (10) Patent No.: US 11,567,366 B2
(45) Date of Patent: Jan. 31, 2023

(54) LIGHT EMITTING PANEL AND DISPLAY DEVICE

(71) Applicant: TCL CHINA STAR OPTOELECTRONICS TECHNOLOGY CO., LTD., Shenzhen (CN)

(72) Inventor: Qingyong Zhu, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 238 days.

(21) Appl. No.: 16/617,554

(22) PCT Filed: Nov. 14, 2019

(86) PCT No.: PCT/CN2019/118328
§ 371 (c)(1),
(2) Date: Nov. 27, 2019

(87) PCT Pub. No.: WO2021/047026
PCT Pub. Date: Mar. 18, 2021

(65) Prior Publication Data
US 2021/0333641 A1    Oct. 28, 2021

(30) Foreign Application Priority Data

Sep. 11, 2019  (CN) .......................... 201910858597.6

(51) Int. Cl.
*G02F 1/13357* (2006.01)

(52) U.S. Cl.
CPC .............................. *G02F 1/133608* (2013.01)

(58) Field of Classification Search
CPC ....................... G02F 1/133608; G02F 1/13339
See application file for complete search history.

(56) References Cited

U.S. PATENT DOCUMENTS

| 9,087,488 B1 * | 7/2015 | Zehner .................... G02F 1/167 |
| 2007/0052909 A1 | 3/2007 | Chou et al. |
| 2014/0092351 A1 | 4/2014 | Hatakeyama |

(Continued)

FOREIGN PATENT DOCUMENTS

| CN | 103135287 A | * | 6/2013 | |
| CN | 103135287 A | | 6/2013 | |
| CN | 103207480 A | * | 7/2013 | ....... G02F 1/133351 |

(Continued)

*Primary Examiner* — Karabi Guharay
(74) *Attorney, Agent, or Firm* — Osha Bergman Watanabe & Burton LLP (57) ABSTRACT

A light emitting panel and a display device are provided. The light emitting panel includes a first substrate, an adhesive layer, a second substrate, and a convex portion. The first substrate includes a light emitting region and a peripheral region surrounding the light emitting region. The adhesive layer is disposed on the peripheral region of the first substrate and surrounds the light emitting region. The second substrate is disposed on the adhesive layer. The convex portion surrounds the adhesive layer and is disposed on a first sidewall of the adhesive layer away from the light emitting region. This can avoid cutting the adhesive layer, thereby avoiding poor peeling and improving product yield.

8 Claims, 5 Drawing Sheets

(56) References Cited

U.S. PATENT DOCUMENTS

2016/0291375 A1  10/2016  Meng et al.

FOREIGN PATENT DOCUMENTS

| CN | 103207480 | A |   | 7/2013 |
| CN | 104698695 | A |   | 6/2015 |
| CN | 105242446 | A | * | 1/2016 |
| CN | 105242446 | A |   | 1/2016 |
| CN | 106990620 | A |   | 7/2017 |

* cited by examiner

LIGHT EMITTING PANEL AND DISPLAY DEVICE

FIELD OF INVENTION

The present disclosure relates to the field of display technologies, and more particularly to a light emitting panel and a display device.

BACKGROUND OF INVENTION

In recent years, thin film transistor liquid crystal displays (TFT-LCDs) generally include a thin film transistor substrate (array substrate) and a color filter substrate (CF substrate). The array substrate and the CF substrate are sealed by a seal. With the market's pursuit of simple and beautiful displays, narrow borders have become a trend of high-end displays. Narrow border technologies require that a width of a sealant can be greatly reduced, and precision requirements are higher.

In the related art, in order to improve a screen ratio of a display screen, an excess adhesive layer and an upper array substrate and a lower CF substrate are generally cut off by means of cutting the adhesive layer of a sealant. However, this process is easy to cause issues of poor peeling of a colloid which is not needed when peeling off.

Therefore, the prior art has drawbacks and is in urgent need of improvement.

SUMMARY OF INVENTION

An embodiment of the present application provides a light emitting panel, which can avoid cutting an adhesive layer, thereby avoiding issues of poor peeling and improving product yield.

In a first aspect, an embodiment of the present application provides a light emitting panel. The light emitting panel includes a first substrate, an adhesive layer, a second substrate, and a convex portion. The first substrate includes a light emitting region and a peripheral region surrounding the light emitting region. The adhesive layer is disposed on the peripheral region of the first substrate and surrounds the light emitting region. The second substrate is disposed on the adhesive layer. The convex portion surrounds the adhesive layer and is disposed on a first sidewall of the adhesive layer away from the light emitting region.

In an embodiment of the present application, at least one interval exists between the convex portion surrounding the light emitting region and the light emitting region, and the light emitting panel further includes a metal layer disposed at the interval.

In an embodiment of the present application, the convex portion forms an angle with the first substrate that is greater than or equal to 90 degrees.

In an embodiment of the present application, the light emitting panel further includes a barrier layer surrounded by the adhesive layer and disposed on a second sidewall of the adhesive layer adjacent to the light emitting region.

In an embodiment of the present application, a width of the barrier layer ranges between 10 μm and 100 μm, and a thickness of the barrier layer and a thickness of the adhesive layer are same.

In an embodiment of the present application, the barrier layer includes a first sub-barrier layer and a second sub-barrier layer, the second sub-barrier layer is disposed on the first sub-barrier layer, the second sub-barrier layer is integrally formed with the second substrate, and the first sub-barrier layer is integrally formed with the first substrate.

In a second aspect, an embodiment of the present application further provides a method of fabricating a light emitting panel. The method includes providing a first substrate, wherein the first substrate includes a light emitting region and a peripheral region surrounding the light emitting region, and a convex portion surrounding the light emitting region is disposed on the peripheral region, applying a colloid on the convex portion and the peripheral region; covering a second substrate on the first substrate, and cutting the second substrate, the convex portion, and the first substrate around the light emitting region on the convex portion.

In an embodiment of the present application, covering the second substrate on the first substrate includes covering the second substrate on the first substrate, so that the colloid coated on the convex portion flows along two sides of the convex portion to the peripheral region of the first substrate.

In an embodiment of the present application, after cutting the second substrate, the convex portion, and the first substrate around the light emitting region on the convex portion, the method further includes at least one interval disposed between the convex portion surrounding the light emitting region and the light emitting region and forming a metal layer at the interval.

In a third aspect, an embodiment of the present application further provides a display device including a light emitting panel and a housing. The light emitting panel is disposed on the housing. The light emitting panel includes a first substrate including a light emitting region and a peripheral region surrounding the light emitting region; an adhesive layer disposed on the peripheral region of the first substrate and surrounding the light emitting region; a second substrate disposed on the adhesive layer; a convex portion surrounding the adhesive layer and disposed on a first sidewall of the adhesive layer away from the light emitting region, wherein at least one interval exists between the convex portion surrounding the light emitting region and the light emitting region; a metal layer disposed at the interval; and a barrier layer surrounded by the adhesive layer and disposed on a second sidewall of the adhesive layer adjacent to the light emitting region.

In an embodiment of the present application, the convex portion forms an angle with the first substrate that is greater than or equal to 90 degrees.

In an embodiment of the present application, a width of the barrier layer ranges between 10 μm and 100 μm, and a thickness of the barrier layer and a thickness of the adhesive layer are same.

In an embodiment of the present application, the barrier layer includes a first sub-barrier layer and a second sub-barrier layer, the second sub-barrier layer is disposed on the first sub-barrier layer, the second sub-barrier layer is integrally formed with the second substrate, and the first sub-barrier layer is integrally formed with the first substrate.

Beneficial effects of an embodiment of the present application are that, the light emitting panel includes a first substrate, an adhesive layer, a second substrate, and a convex portion. The first substrate includes a light emitting region and a peripheral region surrounding the light emitting region. The adhesive layer is disposed on the peripheral region of the first substrate and surrounds the light emitting region. The second substrate is disposed on the adhesive layer. The convex portion surrounds the adhesive layer and is disposed on a first sidewall of the adhesive layer away from the light emitting region. This can avoid cutting the adhesive layer, thereby avoiding poor peeling and improving product yield.

DESCRIPTION OF DRAWINGS

In order to more clearly illustrate the technical solutions in the embodiments of the present application, the drawings used in the description of the embodiments will be briefly described below. It is obvious that the drawings in the following description are only some embodiments of the present application. Other drawings can also be obtained from those skilled in the art based on these drawings without paying any creative effort.

DETAILED DESCRIPTION OF PREFERRED EMBODIMENTS

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application.

In the prior art, in order to obtain a screen ratio, a display device usually cuts a colloid applied on a peripheral region of a color filter substrate (CF substrate). At present, a width of a border of a liquid crystal display is less than 0.4 mm, and a width of a sealant is less than 0.3 mm. However, use of the above-mentioned cutting method causes poor peeling of an adhesive layer which is not required after the cutting, and causes the remaining adhesive layer to have an uneven thickness.

An embodiment of the present application provides a display device including a light emitting panel and a housing. The light emitting panel is disposed on the housing. The light emitting panel includes a first substrate including a light emitting region and a peripheral region surrounding the light emitting region; an adhesive layer disposed on the peripheral region of the first substrate and surrounding the light emitting region; a second substrate disposed on the adhesive layer; a convex portion surrounding the adhesive layer and disposed on a first sidewall of the adhesive layer away from the light emitting region, wherein at least one interval exists between the convex portion surrounding the light emitting region and the light emitting region; a metal layer disposed at the interval; and a barrier layer surrounded by the adhesive layer and disposed on a second sidewall of the adhesive layer adjacent to the light emitting region.

In an embodiment of the present application, the convex portion forms an angle with the first substrate that is greater than or equal to 90 degrees.

In an embodiment of the present application, a width of the barrier layer ranges between 10 μm and 100 μm, and a thickness of the barrier layer and a thickness of the adhesive layer are same.

In an embodiment of the present application, the barrier layer includes a first sub-barrier layer and a second sub-barrier layer, the second sub-barrier layer is disposed on the first sub-barrier layer, the second sub-barrier layer is integrally formed with the second substrate, and the first sub-barrier layer is integrally formed with the first substrate.

Figure 1:
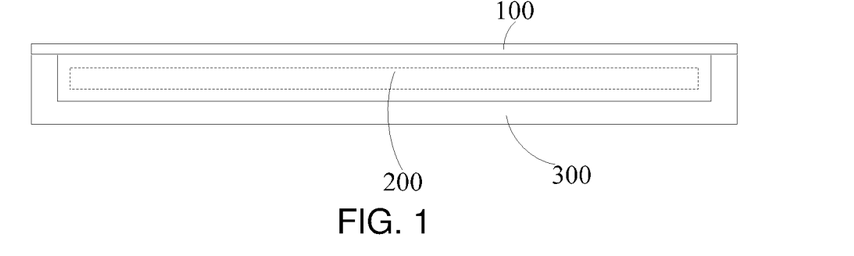
FIG. 1 is a schematic structural diagram of a display device according to an embodiment of the present application.

Referring to FIG. 1, which is a schematic structural diagram of a display device 1000 according to an embodiment of the present application. The display device 1000 may include a light emitting panel 100, a control circuit 200, and a housing 300. It should be noted that the display device 1000 shown in FIG. 1 is not limited to the above, and may further include other devices, such as a camera, an antenna structure, a pattern unlocking module, and the like.

The light emitting panel 100 is disposed on the housing 300.

In some embodiments, the light emitting panel 100 may be fixed to the housing 300, and the light emitting panel 100 and the housing 300 form a sealed space to accommodate devices such as the control circuit 200.

In some embodiments, the housing 300 can be made of a flexible material, such as a plastic housing or a silicone housing.

The control circuit 200 is mounted in the housing 300. The control circuit 200 can be a main board of the display device 1000. The control circuit 200 can integrate one, two or more of a battery, an antenna structure, a microphone, a speaker, a headphone interface, a universal serial bus interface, a camera, a distance sensor, an ambient light sensor, a receiver, and a processor.

The light emitting panel 100 is mounted in the housing 300. In addition, the light emitting panel 100 is electrically connected to the control circuit 200 to form a display surface of the display device 1000. The light emitting panel 100 may include a display area and a non-display area. The display area can be used to display an image of the display device 1000 or for a user to perform touch manipulation or the like. This non-display area can be used to set various functional components.

An embodiment of the present application further provides a method of fabricating a light emitting panel. The method includes providing a first substrate, wherein the first substrate includes a light emitting region and a peripheral region surrounding the light emitting region, and a convex portion surrounding the light emitting region is disposed on the peripheral region, applying a colloid on the convex portion and the peripheral region; covering a second substrate on the first substrate, and cutting the second substrate, the convex portion, and the first substrate around the light emitting region on the convex portion.

In an embodiment of the present application, covering the second substrate on the first substrate includes covering the second substrate on the first substrate, so that the colloid coated on the convex portion flows along two sides of the convex portion to the peripheral region of the first substrate.

In an embodiment of the present application, after cutting the second substrate, the convex portion, and the first substrate around the light emitting region on the convex portion, the method further includes at least one interval disposed between the convex portion surrounding the light emitting region and the light emitting region and forming a metal layer at the interval.

Figure 2:
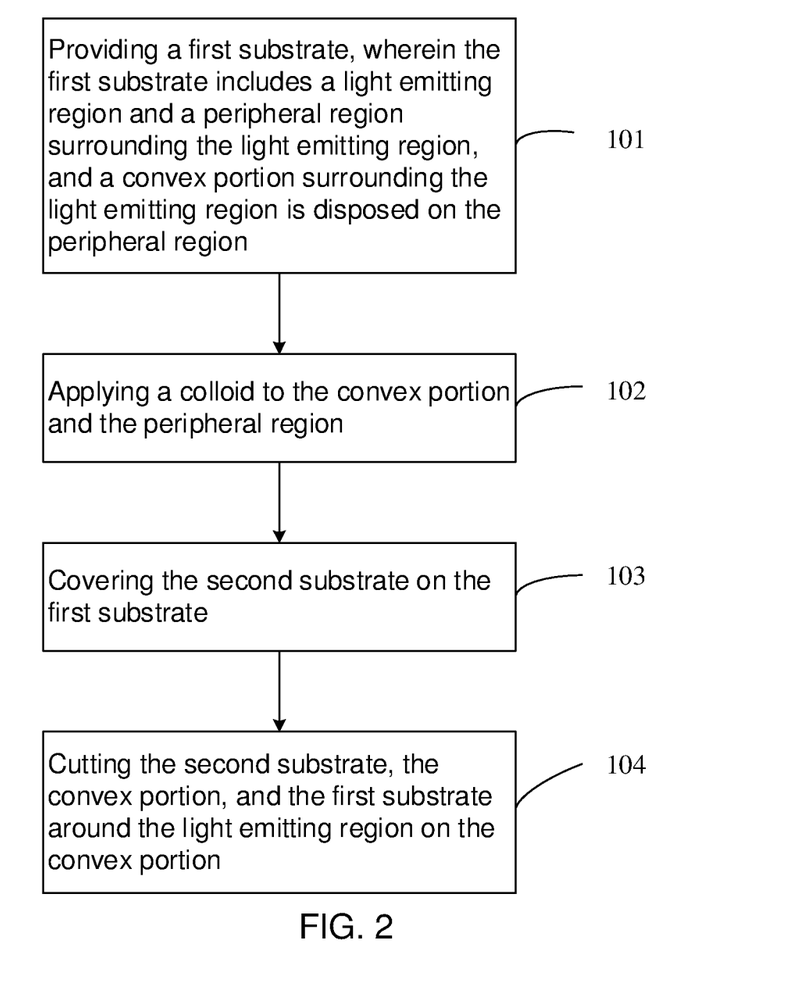
FIG. 2 is a schematic flowchart of a method for fabricating a light emitting panel according to an embodiment of the present application.
Figure 3:
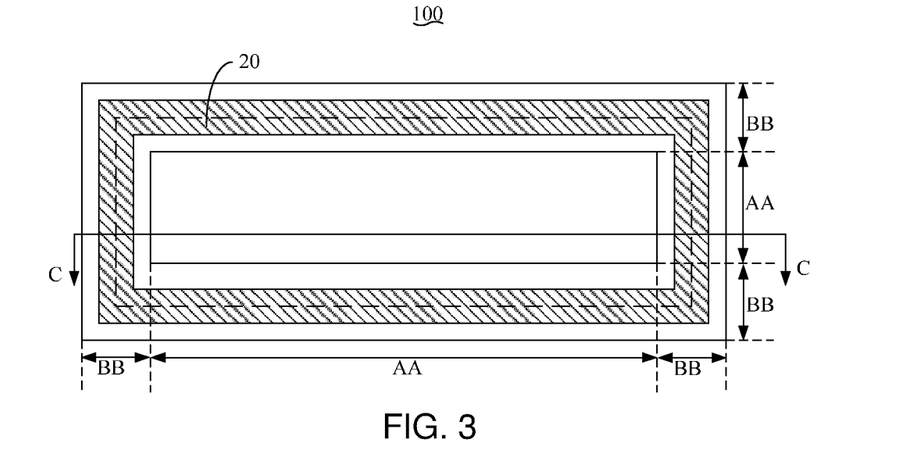
FIG. 3 is a first intermediate product diagram of a light emitting panel according to an embodiment of the present application.

In order to avoid issues of poor peeling of the adhesive layer during cutting and peeling, an embodiment of the present application provides a method for fabricating a light emitting panel. Referring to FIG. 2 and FIG. 3, FIG. 2 is a schematic flowchart of a method for fabricating a light emitting panel according to an embodiment of the present disclosure, and FIG. 3 is a first intermediate product diagram of a light emitting panel according to an embodiment of the present application. The method includes:

Step 101, providing a first substrate 10 is provided, wherein the first substrate 10 includes a light emitting region AA and a peripheral region BB surrounding the light emitting region, and a convex portion 20 surrounding the light emitting region AA is disposed on the peripheral region BB.

Specifically, the first substrate 10 is a thin film transistor substrate (array substrate), which is mainly used to drive light emission according to a driving circuit. Therefore, the first substrate 10 generally includes a light-emitting film group, pixel units (R, G, B, etc.), a thin film transistor (TFT), a liquid crystal layer, and the like. The first substrate 10 is formed by a process such as washing, sputtering, plasma enhanced chemical vapor deposition (P-CVD), exposure, wet/dry etching, and stripping.

As shown in FIG. 3, the first substrate 10 includes a light emitting region AA and a peripheral region BB surrounding the light emitting region AA. Light generated by the first substrate 10 is emitted from the light emitting region AA to the outside. The peripheral region BB is a package region. A convex portion 20 surrounding the light emitting region AA is disposed on the peripheral region BB, and a region of a certain width is reserved between the convex portion 20 and the light emitting region AA, which is a region required for subsequent coating of a colloid. A cross-sectional shape of the convex portion 20 may be a trapezoidal shape, a rectangular shape, or a combination of the two, which is not limited herein.

Step 102, applying a colloid to the convex portion 20 and the peripheral region BB.

Figure 4:
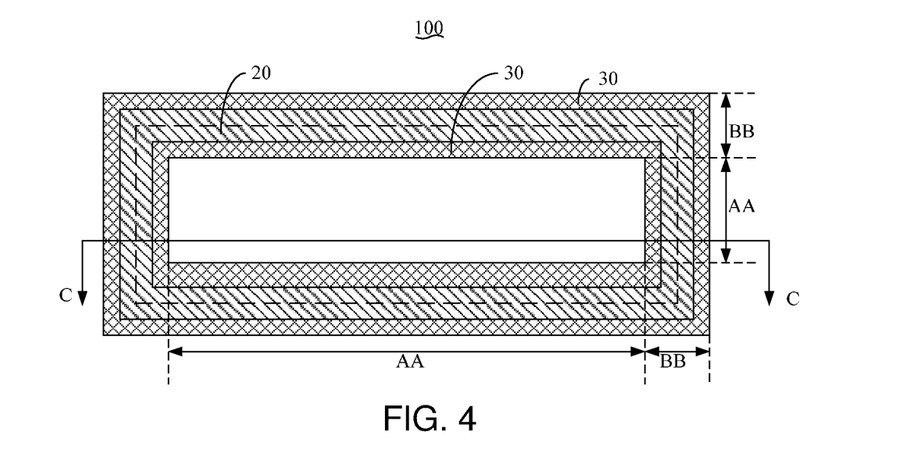
FIG. 4 is a second intermediate product diagram of a light emitting panel according an embodiment of the present application.
Figure 5:
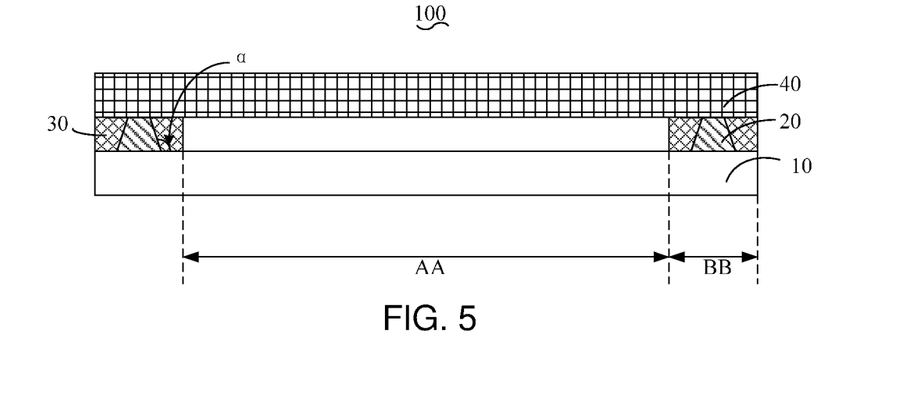
FIG. 5 is a third intermediate product diagram of a light emitting panel according an embodiment of the present application.

Specifically, the colloid is applied to a side of the convex portion 20 away from the first substrate 10 and a region of the peripheral region BB other than the convex portion 20. After the coating is completed, the colloid is cured to form an adhesive layer 30 as shown in FIG. 4 and FIG. 5. FIG. 4 is a second intermediate product diagram of a light emitting panel according to an embodiment of the present application. FIG. 5 is a third intermediate product diagram of a light emitting panel according to an embodiment, and FIG. 5 is a schematic cross-sectional view of FIG. 4 in CC direction.

In some embodiments, the convex portion 20 forms a first angle α with the first substrate 10, and the first angle α is greater than 90°. Here, taking a cross-sectional shape of the convex portion 20 as a trapezoid, the angle formed by the convex portion 20 and the first substrate 10 is divided into a first angle α and a second angle β, and the first angle α is as shown in FIG. 5. It is shown that the first angle α is greater than 90°.

Step 103, covering the second substrate 40 on the first substrate 10.

Specifically, the second substrate 40 is a color filter substrate (CF substrate), which generally includes a glass substrate and a black matrix (BM), a color layer, a protective layer, and an oxynitride conductive film (ITO) on the glass substrate (not shown). Here, a width of the second substrate 40 is required to be greater than or equal to a width of the first substrate 10, such that the second substrate 40 can be disposed on the convex portion 20 of the first substrate 10.

Specifically, if the cross-sectional shape of the convex portion 20 is trapezoidal, the step 103 specifically includes the following.

The second substrate 40 is covered on the first substrate 10, such that the colloid coated on the convex portion 20 flows to the first substrate 10 along both sides of the convex portion 20. Side surfaces of the convex portion 20 that are close to and away from the light emitting region AA are slope sides. When the second substrate 40 is placed on the convex portion 20, liquid colloid flows to the peripheral region BB with the sloped sides of the convex portion 20.

Since the colloid is provided on the side of the convex portion 20 away from the first substrate 10, a height of the convex portion 20 is slightly smaller than a height of the first substrate 10 to the second substrate 20, and the height of the convex portion 20 ranges from 50 to 200 μm.

Step 104, cutting the second substrate 40, the convex portion 20, and the first substrate 10 around the light emitting region AA on the convex portion 20.

Figure 6:
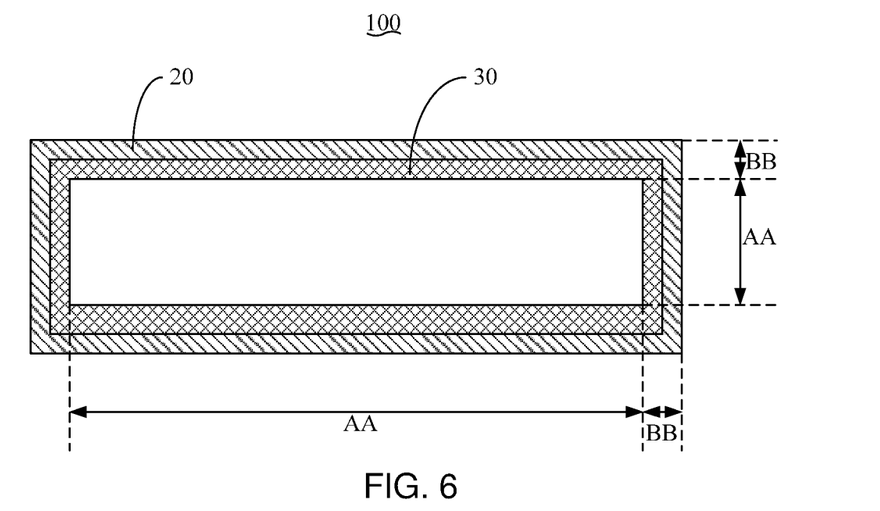
FIG. 6 is a schematic diagram of a first structure of a light emitting panel according to an embodiment of the present application.

Here, the specific cutting manner can be cut along a broken line in FIG. 4, which is a cutting line to obtain a shape as shown in FIG. 6. FIG. 6 is a schematic diagram of a first structure of a light emitting panel according to an embodiment of the present application. A side surface of the cut adhesive layer 30 away from the light emitting region AA is a first sidewall, and a side surface of the cut adhesive layer 30 close to the light emitting region AA is a second sidewall.

Figure 7:
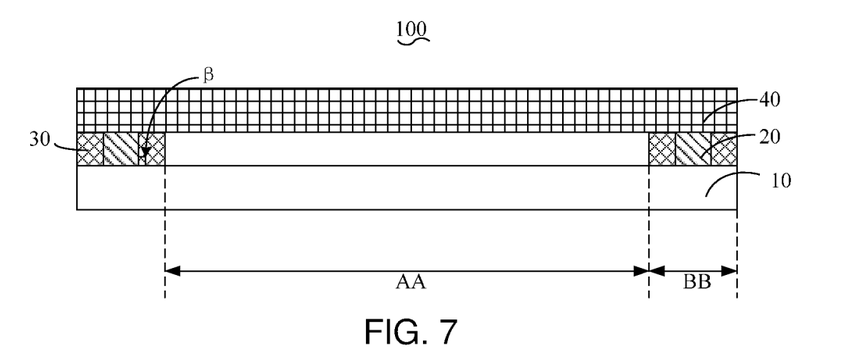
FIG. 7 is a fourth intermediate product diagram of a light emitting panel according an embodiment of the present application.

In some embodiments, as shown in FIG. 7, which is a fourth intermediate product diagram of a light emitting panel according to an embodiment of the present application. The convex portion 20 forms a second angle β with the first substrate 10. The second angle β is equal to 90°. Specifically, the second angle β is equal to 90°, that is, a cross-sectional shape of the convex portion 20 is a rectangle.

Figure 8:
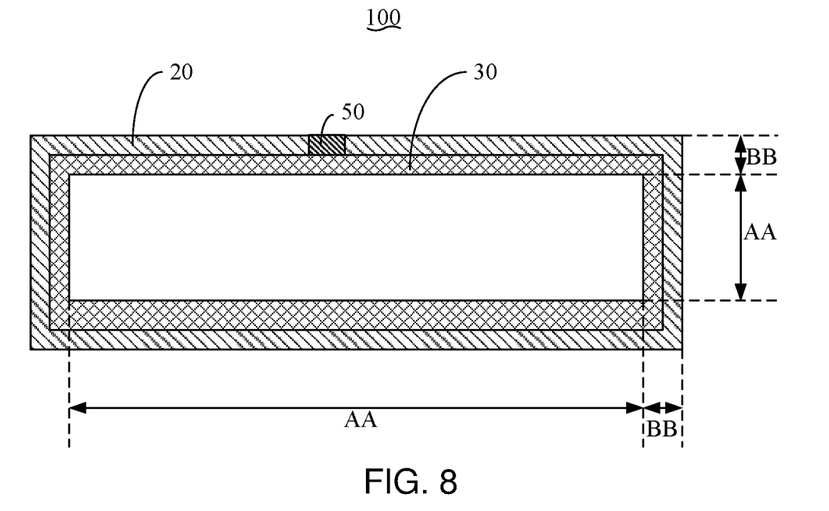
FIG. 8 is a fifth intermediate product diagram of a light emitting panel according an embodiment of the present application.

In some embodiments, as shown in FIG. 8, which is a fifth intermediate product diagram of a light emitting panel according to an embodiment of the present application. The convex portion 20 surrounding the light emitting region AA has at least one interval at which the metal layer 50 is disposed.

Specifically, in order to allow an electrical connection device such as a driving circuit to be accessible from the outside to the light emitting region, it is necessary to provide an interval on the convex portion 20 surrounding the light emitting region AA, and to provide a metal layer 50 at the interval to ensure that the driving circuit and other devices that need electrical connection can be connected normally. A width of the interval ranges from 300 to 900 μm.

Therefore, after the second substrate 40, the protrusion 20, and the first substrate 10 are cut around the light-emitting region AA on the convex portion 20, the method further includes the following.

The convex portion 20 surrounding the light emitting region AA has at least one interval at which the metal layer 50 is formed.

Figure 9:
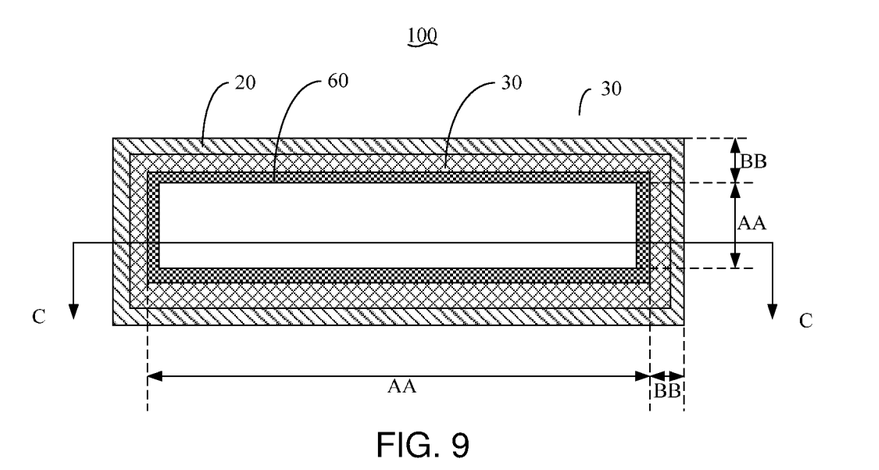
FIG. 9 is a schematic diagram of a second structure of a light emitting panel according to an embodiment of the present application.
Figure 10:
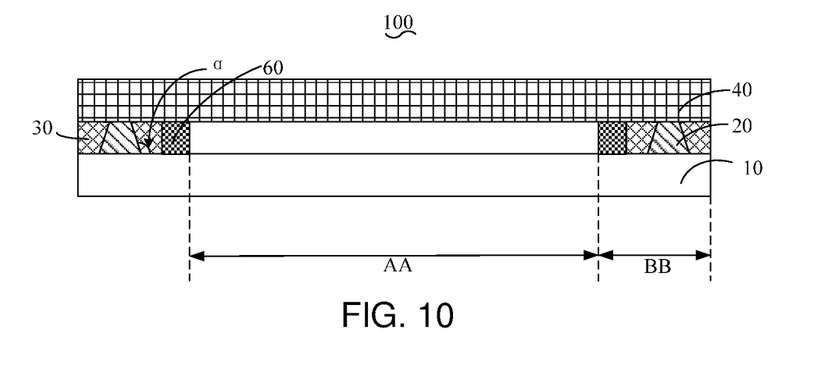
FIG. 10 is a sixth intermediate diagram of a light emitting panel according an embodiment of the present application.

In some embodiments, as shown in FIG. 9 and FIG. 10, FIG. 9 is a second schematic structural diagram of a light emitting panel according to an embodiment of the present disclosure, and FIG. 10 is a sixth intermediate product diagram of a light emitting panel according to an embodiment of the present application, and FIG. 10 is a schematic cross-sectional view of the light emitting panel of FIG. 9 in CC direction. A barrier layer 60 surrounded by the adhesive layer 30 is disposed on the second sidewall of the adhesive layer 30 adjacent to the light emitting region AA.

In order to prevent a liquid colloid from flowing into the light emitting region AA, a barrier layer 60 may be disposed on the second sidewall of the adhesive layer 30 adjacent to the light emitting region AA. The barrier layer 60 has a width of 10 to 100 μm. In order to achieve the barrier effect, a thickness of the barrier layer 60 is the same as a thickness of the adhesive layer 20 and is equal to a distance from the first substrate 10 to the second substrate 40.

Figure 11:
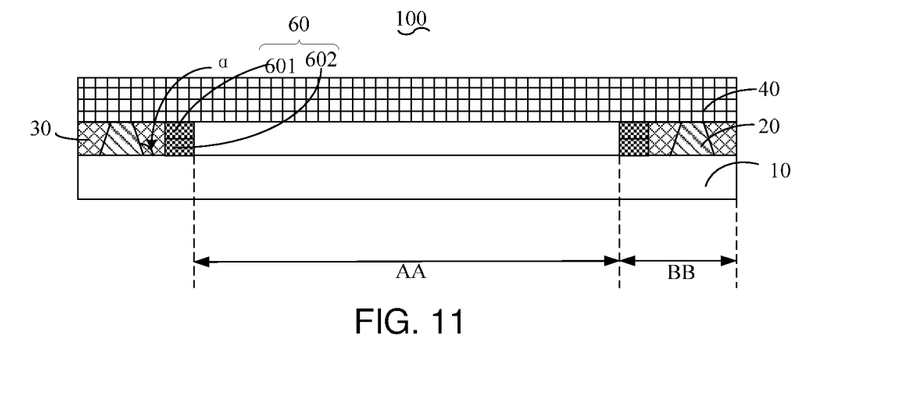
FIG. 11 is a seventh intermediate product diagram of a light emitting panel according an embodiment of the present application.

In some embodiments, the barrier layer 60 includes a first sub-barrier layer 601 and a second sub-barrier layer 602, the second sub-barrier layer 602 is disposed on the first sub-barrier layer 601, the second sub-barrier layer 602 is integrally formed with the second substrate 40, and the first sub-barrier layer 601 is integrally formed with the first substrate 10.

Specifically, as shown in FIG. 11, FIG. 11 is a seventh intermediate product diagram of a light emitting panel according to an embodiment of the present application. In a preparation process, since the second substrate 40 is covered on the first substrate 10, the barrier layer 60 can be divided into the first sub-barrier layer 601 and the second sub-barrier layer 602. The second sub-barrier layer 602 is integrally formed with the second substrate 40, and the first sub-barrier layer 601 is integrally formed with the first substrate 10. Thus, when the second substrate 40 is covered, the second sub-barrier layer 602 can be disposed on the first sub-barrier layer 601 to form the barrier layer 60, and the barrier effect can also be achieved. Similarly, the convex portion 20 can also be divided into a first sub-protrusion 201 and a second sub-protrusion 202, the second sub-protrusion 202 is disposed on the first sub-protrusion 201, the second sub-protrusion portion 202 is integrally formed with the second substrate 40, and the first sub-protrusion portion 201 is integrally formed with the first substrate 10, thereby forming the light emitting panel 100 as shown in FIG. 6 or FIG. 9.

An embodiment of the present application provides a light emitting panel. The light emitting panel includes a first substrate, an adhesive layer, a second substrate, and a convex portion. The first substrate includes a light emitting region and a peripheral region surrounding the light emitting region. The adhesive layer is disposed on the peripheral region of the first substrate and surrounds the light emitting region. The second substrate is disposed on the adhesive layer. The convex portion surrounds the adhesive layer and is disposed on a first sidewall of the adhesive layer away from the light emitting region.

In an embodiment of the present application, at least one interval exists between the convex portion surrounding the light emitting region and the light emitting region, and the light emitting panel further includes a metal layer disposed at the interval.

In an embodiment of the present application, the convex portion forms an angle with the first substrate that is greater than or equal to 90 degrees.

In an embodiment of the present application, the light emitting panel further includes a barrier layer surrounded by the adhesive layer and disposed on a second sidewall of the adhesive layer adjacent to the light emitting region.

In an embodiment of the present application, a width of the barrier layer ranges between 10 μm and 100 μm, and a thickness of the barrier layer and a thickness of the adhesive layer are same.

In an embodiment of the present application, the barrier layer includes a first sub-barrier layer and a second sub-barrier layer, the second sub-barrier layer is disposed on the first sub-barrier layer, the second sub-barrier layer is integrally formed with the second substrate, and the first sub-barrier layer is integrally formed with the first substrate.

Beneficial effects of an embodiment of the present application are that, the light emitting panel 100 includes a first substrate, an adhesive layer, a second substrate, and a convex portion. The first substrate includes a light emitting region and a peripheral region surrounding the light emitting region. The adhesive layer is disposed on the peripheral region of the first substrate and surrounds the light emitting region. The second substrate is disposed on the adhesive layer. The convex portion surrounds the adhesive layer and is disposed on a first sidewall of the adhesive layer away from the light emitting region. This can avoid cutting the adhesive layer, thereby avoiding poor peeling and improving product yield.

The light emitting panel and the display device provided by the embodiments of the present application are described in detail above. The principles and implementations of the present application are described herein with specific examples. The description of the above embodiments is only for helping to understand the technical solutions of the present application and the core ideas thereof. It should be understood by those skilled in the art that the technical solutions described in the foregoing embodiments may be modified, or some of the technical features may be equivalently replaced. The modifications and substitutions do not depart from the scope of the technical solutions of the embodiments of the present application.

What is claimed is:

1. A light emitting panel, comprising:
   a first substrate comprising a light emitting region and a peripheral region surrounding the light emitting region;
   an adhesive layer disposed on the peripheral region of the first substrate and surrounding the light emitting region;
   a second substrate disposed on the adhesive layer;
   a convex portion surrounding the adhesive layer and disposed on a first sidewall of the adhesive layer away from the light emitting region; and
   a barrier layer surrounded by the adhesive layer and disposed on a second sidewall of the adhesive layer adjacent to the light emitting region;
   wherein a width of the second substrate is greater than a width of the first substrate, such that the second substrate is disposed on the convex portion of the first substrate;
   wherein the adhesive layer is provided on a side of the convex portion away from the first substrate, a height of the convex portion is smaller than a height of the first substrate to the second substrate;

wherein a thickness of the barrier layer is the same as a thickness of the adhesive layer and is equal to a distance from the first substrate to the second substrate, at least one interval exists between the convex portion surrounding the light emitting region, the light emitting panel further comprises a metal layer disposed at the at least one interval, a width of the barrier layer ranges between 10 μm and 100 μm, and a width of the at least one interval ranges from 300 μm to 900 μm.

2. The light emitting panel according to claim 1, wherein the convex portion forms an angle with the first substrate that is greater than or equal to 90 degrees.

3. The light emitting panel according to claim 1, wherein the barrier layer comprises a first sub-barrier layer and a second sub-barrier layer, the second sub-barrier layer is disposed on the first sub-barrier layer, the second sub-barrier layer is integrally formed with the second substrate, and the first sub-barrier layer is integrally formed with the first substrate.

4. A method of fabricating a light emitting panel, comprising:

providing a first substrate, wherein the first substrate comprises a light emitting region and a peripheral region surrounding the light emitting region, and a convex portion surrounding the light emitting region is disposed on the peripheral region;

applying a colloid on the convex portion and the peripheral region to form an adhesive layer disposed on the peripheral region of the first substrate and surrounding the light emitting region, wherein the convex portion is disposed on a first sidewall of the adhesive layer away from the light emitting region;

covering a second substrate on the first substrate;

forming a barrier layer surrounded by the adhesive layer and disposed on a second sidewall of the adhesive layer adjacent to the light emitting region; and cutting the second substrate, the convex portion, and the first substrate around the light emitting region on the convex portion;

wherein a width of the second substrate is greater than a width of the first substrate, such that the second substrate is disposed on the convex portion of the first substrate;

wherein the adhesive layer is provided on a side of the convex portion away from the first substrate, a height of the convex portion is smaller than a height of the first substrate to the second substrate;

wherein a thickness of the barrier layer is the same as a thickness of the adhesive layer and is equal to a distance from the first substrate to the second substrate, after cutting the second substrate, the convex portion, and the first substrate around the light emitting region on the convex portion, the method further comprises at least one interval disposed between the convex portion surrounding the light emitting region and forming a metal layer at the at least one interval, a width of the barrier layer ranges between 10 μm and 100 μm, and a width of the at least one interval ranges from 300 μm to 900 μm.

5. The method of fabricating the light emitting panel according to claim 4, wherein covering the second substrate on the first substrate comprises covering the second substrate on the first substrate, so that the colloid coated on the convex portion flows along two sides of the convex portion to the peripheral region of the first substrate.

6. A display device comprising a light emitting panel and a housing, the light emitting panel disposed on the housing, the light emitting panel comprising:

a first substrate comprising a light emitting region and a peripheral region surrounding the light emitting region;

an adhesive layer disposed on the peripheral region of the first substrate and surrounding the light emitting region;

a second substrate disposed on the adhesive layer;

a convex portion surrounding the adhesive layer and disposed on a first sidewall of the adhesive layer away from the light emitting region, wherein at least one interval exists between the convex portion surrounding the light emitting region and the light emitting region;

a metal layer disposed at the interval; and a barrier layer surrounded by the adhesive layer and disposed on a second sidewall of the adhesive layer adjacent to the light emitting region;

wherein a width of the second substrate is greater than a width of the first substrate, such that the second substrate is disposed on the convex portion of the first substrate;

wherein the adhesive layer is provided on a side of the convex portion away from the first substrate, a height of the convex portion is smaller than a height of the first substrate to the second substrate;

wherein a thickness of the barrier layer is the same as a thickness of the adhesive layer and is equal to a distance from the first substrate to the second substrate, at least one interval exists between the convex portion surrounding the light emitting region, the light emitting panel further comprises a metal layer disposed at the at least one interval, a width of the barrier layer ranges between 10 μm and 100 μm, and a width of the at least one interval ranges from 300 μm to 900 μm.

7. The display device according to claim 6, wherein the convex portion forms an angle with the first substrate that is greater than or equal to 90 degrees.

8. The display device according to claim 6, wherein the barrier layer comprises a first sub-barrier layer and a second sub-barrier layer, the second sub-barrier layer is disposed on the first sub-barrier layer, the second sub-barrier layer is integrally formed with the second substrate, and the first sub-barrier layer is integrally formed with the first substrate.

* * * * *